(12) United States Patent
Kelly et al.

(10) Patent No.: US 8,548,274 B2
(45) Date of Patent: Oct. 1, 2013

(54) SYSTEMS AND METHODS FOR EFFICIENT STORAGE OF IMAGE TRANSFORMATIONS

(75) Inventors: Stuart Kelly, Reading (GB); Anthony Huggett, Sherborne St. John (GB)

(73) Assignee: Aptina Imaging Corporation, George Town (KY)

( * ) Notice: Subject to any disclaimer, the term of this patent is extended or adjusted under 35 U.S.C. 154(b) by 292 days.

(21) Appl. No.: 13/194,107

(22) Filed: Jul. 29, 2011

(65) Prior Publication Data

US 2012/0275725 A1 Nov. 1, 2012

Related U.S. Application Data

(60) Provisional application No. 61/480,542, filed on Apr. 29, 2011.

(51) Int. Cl.
- *G06T 15/40* (2011.01)
- *G06G 5/00* (2006.01)
- *G06K 9/36* (2006.01)
- *G06K 9/32* (2006.01)

(52) U.S. Cl.
USPC ............ 382/300; 382/284; 382/294; 348/46; 345/419; 345/629

(58) Field of Classification Search
USPC ................ 382/162–167, 284–294, 298–300; 345/419, 420, 422, 427, 619, 629
See application file for complete search history.

(56) References Cited

U.S. PATENT DOCUMENTS

| | | | |
|---|---|---|---|
| 5,990,941 A * | 11/1999 | Jackson et al. | 348/207.99 |
| 6,128,108 A * | 10/2000 | Teo | 358/540 |
| 6,215,519 B1 * | 4/2001 | Nayar et al. | 348/159 |
| 6,683,608 B2 * | 1/2004 | Golin et al. | 345/419 |
| 7,412,091 B2 * | 8/2008 | Hack | 382/154 |
| 7,865,013 B2 * | 1/2011 | Hack | 382/167 |
| 8,270,763 B2 * | 9/2012 | Huggett | 382/282 |
| 2002/0015049 A1 * | 2/2002 | Golin et al. | 345/629 |
| 2004/0061933 A1 * | 4/2004 | Hack | 359/443 |
| 2008/0129723 A1 * | 6/2008 | Comer et al. | 345/419 |
| 2008/0284797 A1 * | 11/2008 | Hack | 345/629 |
| 2010/0014770 A1 * | 1/2010 | Huggett et al. | 382/260 |
| 2010/0303383 A1 | 12/2010 | Huggett | |

OTHER PUBLICATIONS

Ishii et al, An Image Conversion Algorithm to Perspective Image for from Fish Eye Image Human Eyes, Proceedings of the 2003 Ieeuasme International Conference on Advanced Intelligent Mechatronics (AIM 2003).*

Atkins, Fisheye to Rectilinear Conversion, http://photo.net/learn/fisheye/, 2003.*

(Continued)

*Primary Examiner* — Andrae S Allison

(57) ABSTRACT

Systems and methods for generating efficient transformed input image address sets for producing a multi-pane output image from an input image are disclosed. The input address sets may be generated by applying a first transformation corresponding to one pane of the output image to output pixel addresses to create first transformed input addresses, applying a second transformation corresponding to another pane to the output image pixel addresses to create second transformed input addresses, and storing, for one output pixel address, a first transformed image pixel address and a second transformed input pixel address and, for another output pixel address, including a first transformed input pixel address, but no second transformed address.

20 Claims, 8 Drawing Sheets

(56) References Cited

OTHER PUBLICATIONS

Kweon, Panoramic Image Composed of Multiple Rectilinear Images Generated from a Single Fisheye Image, Journal of the Optical Society of Korea vol. 14, No. 2, Jun. 2010, pp. 109-120.*

Baofeng Zhang; Zhicliang Qi; JunChao Zhu; Zuoliang Cao, "Omnidirection image restoration based on spherical perspective projection," Circuits and Systems, 2008. APCCAS 2008. IEEE Asia Pacific Conference on, vol., no., pp. 922,925, Nov. 30, 2008-Dec. 3, 2008.*

* cited by examiner

SYSTEMS AND METHODS FOR EFFICIENT STORAGE OF IMAGE TRANSFORMATIONS

CROSS REFERENCE TO RELATED APPLICATIONS

This application claims priority to U.S. Provisional Application No. 61/480,542, entitled Efficient Spatial Transform Engine for Combining Multiple Views, filed Apr. 29, 2011, the contents of which are incorporated fully herein by reference.

FIELD OF THE INVENTION

The present invention relates to imaging systems and methods and, more particularly, to image transformation methods and systems.

BACKGROUND OF THE INVENTION

Image transforms generally include any suitable transform that creates an output image from an input image. The output image can be created from the entirety of the input image or from any portion of the input image. For example, the output image and the input image can each consist of a set of pixels. The pixels can include information related to their position (e.g., where they are located in the image) and to their data (e.g., the color value of the pixel, the intensity value of the pixel, or both). When performing an image transform on the input image, the pixels of the output image can be calculated from any portion of the pixels of the input image.

Image transforms can include, for example, dewarping, rotations, perspective adjustments, or any other suitable image transform. In a dewarping image transform, a rectilinear version of the input image can be created. For example, an input image can be created from a fisheye lens, thus resulting in a warped input image in which straight lines in the real world can appear curved. Performing a dewarping image transform on the input image may then create a rectilinear output image in which the lines that appeared curved now appear straight. As another example, a rotation image transform can create an output image that changes the direction in which the camera appears to be facing in the input image. As yet another example, a perspective adjustment image transform can create an output image which makes it appear that the camera that took the input image was positioned in a different location.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letters "n" and "N" may represent a non-specific number of elements. Also, lines without arrows connecting components may represent a bi-directional exchange between these components. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
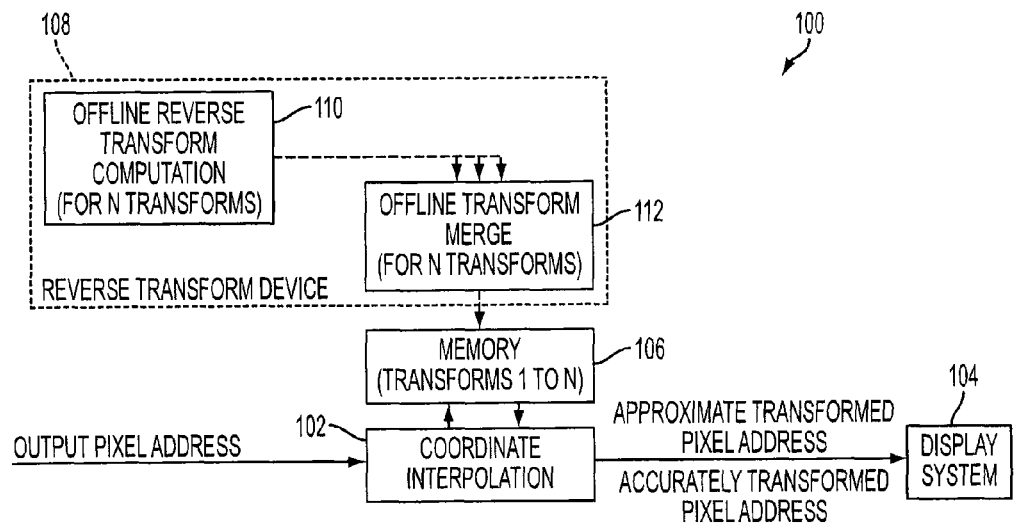
FIG. 1 is a block diagram of an image transformation system in accordance with aspects of the present invention.

An image transform can be accomplished through a reverse lookup process. In a reverse lookup process, the process can begin with the output pixel addresses of the output image. Each output pixel address can then be "reverse transformed" to determine a particular input pixel address of the input image.

The input pixel address that is calculated by the reverse transform can depend on the image transform that is being performed (e.g., dewarping, rotation, perspective adjustment, pan, tilt, zoom, or any other suitable image transform). The input pixel data associated with that particular input pixel address can then be read from the input image and used as output pixel data (e.g., can be used as output pixel data for the output pixel address that was reverse transformed).

The complexity of and the calculations required to perform a reverse transform can depend upon the type of image transform that is performed (e.g., dewarping, rotation, perspective adjustment, pan, tilt, zoom, or any other suitable image transform). Generally, however, the reverse transform calculations can be relatively complex and large in size in comparison to other types of general calculations. For example, if a dedicated circuit is used to perform the reverse transform calculations, this dedicated circuit may require a substantial amount of microchip space due to the complexity of its circuitry. As another example, if software is used to perform the reverse transform, a substantial amount of computing power may be required for performing this reverse transform.

Accordingly, a more efficient image transform can be performed by reverse transforming a subset of the output pixel addresses (e.g., as opposed to reverse transforming all of the output pixel addresses) to obtain "accurate" reverse transformed addresses for this subset of output pixel addresses. The "accurate" reverse transformed addresses for the subset of output pixel addresses can then be interpolated in order to obtain "approximate" reverse transformed addresses for the other output pixel addresses not in the subset. As used herein, the term "approximately transformed address" refers to an estimation of the reverse transform of an output pixel address, where the estimation can be calculated by, for example, interpolation. Furthermore, as used herein, the term "accurately transformed address" refers to an output pixel address that has been reverse transformed. Additional details regarding reverse transformation of pixel addresses may be found in US Patent Application Publication Serial No. 2010/0303383 to Huggett, published on Dec. 2, 2010, the contents of which are incorporated fully herein by reference.

Approximately transformed addresses can be accomplished with fewer calculations and be less complex to determine than accurately transformed addresses. For example, the hardware used to perform a reverse transform may need circuitry that calculates multiple sine or cosine calculations per pixel. The hardware to perform an interpolation, on the other hand, can utilize smaller and less complex circuitry. For example, the hardware for a bilinear interpolation calculation can include smaller and less complex circuitry such as a few multipliers, a few adders, or both. Accordingly, using an interpolator to approximately reverse transform the output pixel addresses, rather than reverse transforming the entire set of output pixels, can provide for a more efficient image transform. For example, using an interpolator can allow for an image transform system that may require less circuitry and thus may use less power and require less microchip space. Additionally, using an interpolator can allow for computational savings (e.g., in hardware, software, or both) due to the decreased complexity of the required calculations.

FIG. 1 depicts an image transform interpolation system 100 in accordance with one embodiment of the invention. The system 100 includes a coordinate interpolator 102 that produces accurately transformed pixel addresses for a subset of output image addresses and produces approximately transformed pixel address for intermediate addresses outside the subset for use in producing a multi-pane output image by a display system 104. The approximately transformed addresses are produced by interpolating the accurately transformed pixel addresses.

Figure 1A:
FIG. 1A is an image of a "fisheye" input image for transformation by the system of FIG. 1.
Figure 1B:
FIG. 1B is a dewarped image of the input image of FIG. 1A.
Figure 1C:
FIG. 1C is a dewarped and left rotated image of the input image of FIG. 1A.
Figure 1D:
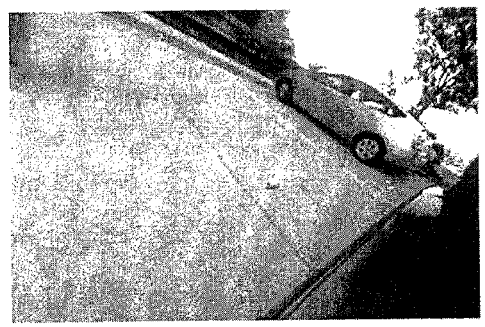
FIG. 1D is a dewarped and right rotated image of the input image of FIG. 1A.
Figure 1E:
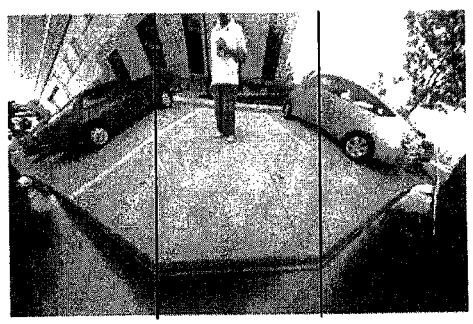
FIG. 1E is a multi-pane output image in accordance with the present invention including portions of the images of FIGS. 1B, 1C, and 1D.

In one embodiment, the display system 104 is a back-up display system (not shown) of an automobile that includes a monitor in the dashboard of an automobile that presents a multi-pane output image of an input image captured by a rearward facing fisheye camera. For example, the rearward facing camera may capture a "fisheye" image (see FIG. 1A) of the scene behind the automobile. The captured image may then be transformed using different transformations with particular transformation better suited for particular areas of the multi-pane output image, e.g., a first transformation associated with a central portion such as a dewarping transformation (see FIG. 1B), a second transformation associated with a left portion such as a combination dewarping/left rotation transformation (see FIG. 1C), and a third transformation associated with a right portion such as a combination dewarping/right rotation transformation (see FIG. 1D). Select portions of the transformed images may be used to create the panels of a multi-pane output image such as illustrated in FIG. 1E.

Figure 2:
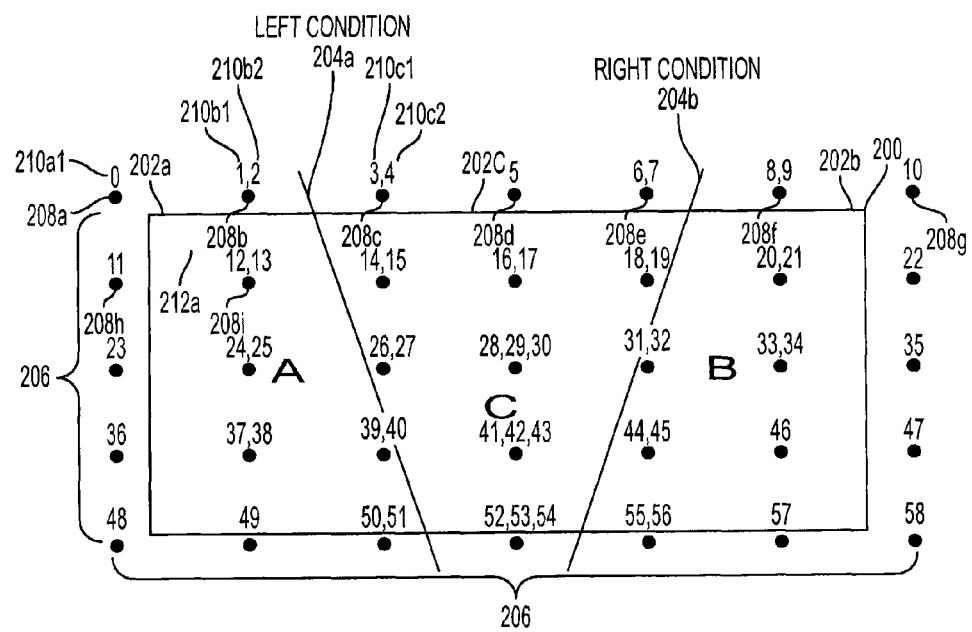
FIG. 2 is an illustration of a multi-pane output image with a grid overlay in accordance with aspects of the present invention.
Figure 2A:
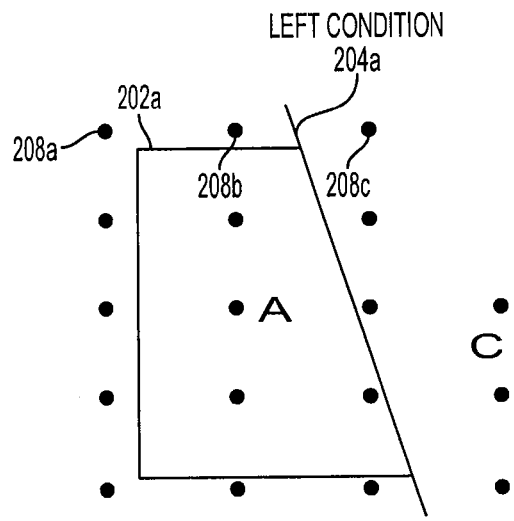
FIGS. 2A, 2B, and 2C are illustrations of individual panes of the multi-pane output image of FIG. 2 with relevant portions of the grid overlay.
Figure 2B:
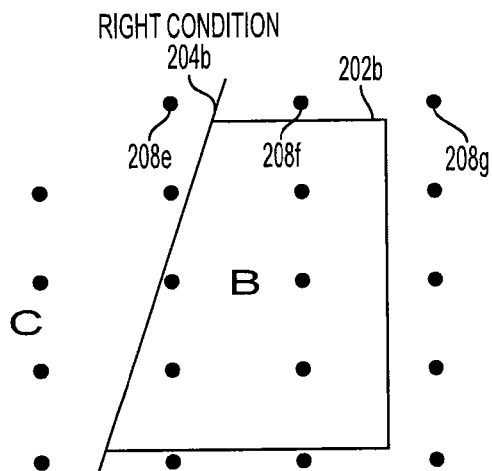
Figure 2C:
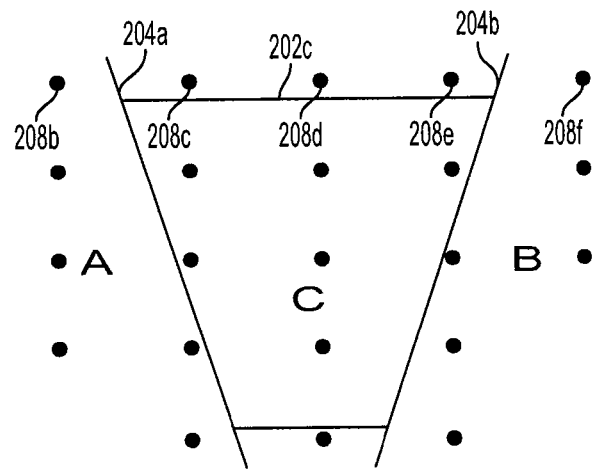

FIG. 2 depicts a multi-pane output image 200, e.g., for presentation on the display system 104 (FIG. 1). The illustrated multi-pane image 200 includes three panes 202a-c, which are arranged side-by-side. Each pane is associated with a respective transformation. A first pane (pane A) 202a (see FIG. 2A) is associated with a first transformation (transform A), a second pane (pane B) 202b (see FIG. 2B) is associated with a second transformation (transform B), and a third pane (pane C) 202c (see FIG. 2C) is associated with a third transformation (transform C).

The illustrated output image 200 includes a subset of points 208 that correspond to output image pixel addresses. The subset of points 208 form a grid 206 that overlays the output image 200. Each point 208 is associated with a set of one or more accurately transformed pixel addresses 210. For example, a first point 208a is associated with one accurately transformed input image pixel address 210a1 and a second point 208b is associated with two pixel address (a first accurately transformed input image pixel address 210b1 and a second accurately transformed input image pixel address 210b2). The illustrated output image 200 also includes intermediate points 212 that are all the points located in the output image 200 other than the subset of points 208. These points 212 are not associated with accurately transformed pixel addresses 210, rather pixel addressed within the input image for these 212 are determined by interpolating the accurately transformed pixel addresses 210 of the points 208 adjacent these points 212. For example, an approximately transformed pixel address for point 212a may be interpolated from the accurately transformed pixel addresses for points 208a, b, h, and i. Selection of the appropriate accurately transformed pixel addresses where multiple addresses exist (such as for point 208b) is described below.

Although three side-by-side panes are described herein, one of skill in the art will understand that the present invention encompasses other numbers or panes and pane arrangements. For example, there may be two panes having a picture-in-picture (PIP) arrangement, the panes may be arranged vertically, diagonally, or a combination thereof. Additionally, although a rectilinear system is described herein, one of skill in the art will understand that the present invention encompasses other types of systems such as a polar coordinate system.

Referring back to FIG. 1, a reverse transform device 108 produces the accurately transformed pixel addresses 210 and stores them in storage device 106 where they can be accessed by the coordinate interpolator 102. In an embodiment, reverse transform device 108 stores in memory 106 only accurately transformed addresses necessary to produce the multi-pane output image. In one embodiment, accurately transformed addresses for each transformation associated with the image 200 are created for every point 208 and the reverse transform device 208 only stores the necessary image creation addresses in memory 106. In accordance with this embodiment, the reverse transform device 108 may include an offline reverse transform computation device 110 and an offline transform merge device 112. In another embodiment, reverse transform device 108 may create only the necessary image creation addresses. In accordance with this embodiment, offline transform merge device 112 may be omitted. Reverse transform device 108 may include non-dedicated circuitry, dedicated circuitry, a software application running on a microprocessor, or any combination of the above.

Reverse transform device 108 may calculate the accurately transformed addresses separately or "offline" from the interpolation process. For example, reverse transform device 108 may calculate all accurately transformed addresses necessary to perform an image transform and store these values in memory 106. Since the reverse transforms are performed offline and are not tied to the interpolation process, these reverse transform calculations can be performed in any suitable amount of time. Additionally, if the offline calculations are performed by a software application (e.g., run by non-dedicated circuitry), image transform system 100 can gain flexibility in the types of reverse transforms and image transforms that may be performed by image transform system 100.

Memory 106 is sized large enough to store all of the accurately transformed addresses necessary to produce the output image 200 (FIG. 2). Since only accurately transformed addresses necessary to produce the image are stored, a smaller memory 106 may be used than would be necessary if accurately transformed addresses associated with each transformation were stored for every point 208. Since all necessary accurately transformed addresses may already be stored in memory and available for the interpolation calculations, image transform system 100 delay components to delay the output pixel addresses may not be necessary. Memory 106 can include any suitable data storage medium such as, for example, a hard-drive, solid state drive, flash memory, permanent memory such as ROM, cache memory, semi-permanent memory such as RAM, or any other suitable type of storage component, or any combination of the above.

The output pixel addresses can be input to interpolator 102. Interpolator 102 can perform bilinear interpolation, bicubic interpolation, or any other suitable type of interpolation or estimation to calculate the approximately transformed output pixel addresses. The approximately transformed output pixel address can be output to display system 104. As necessary, interpolator 102 can receive the accurately transformed addresses required for the interpolation calculations from memory 106.

Figure 3:
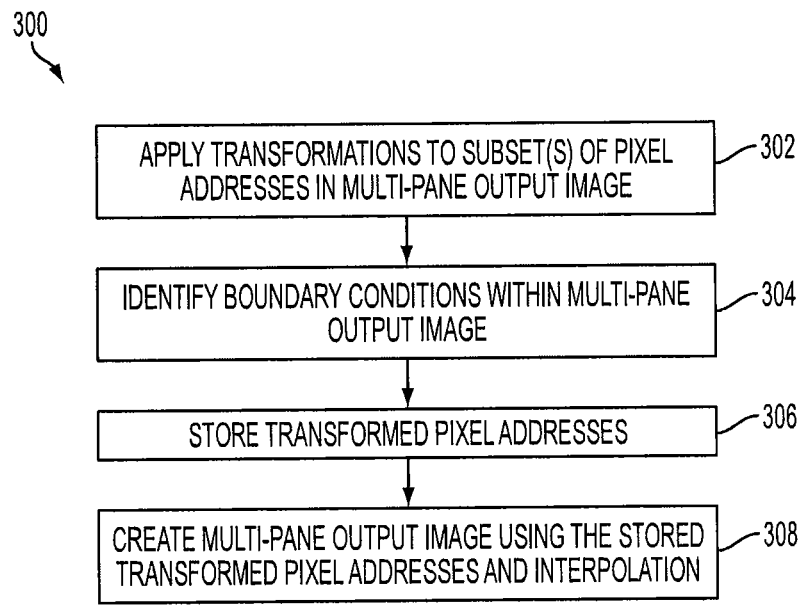
FIG. 3 is a flow chart of steps for creating multi-pane output image in accordance with aspects of the present invention.

FIG. 3 depicts steps for creating a multi-pane output image in accordance with one embodiment. The steps of FIG. 3 are described below with reference to the image transform interpolation system 100 described above with reference to FIGS. 1 and 2 for a three-pane multi-pane output image 200. One of skill in the art will understand from the description herein other systems for performing the steps of FIG. 3 and other pane number/orientations.

At step 302, transformations are applied to subset(s) of pixel addresses in a multi-pane output image to create accurate transformed input image addresses. In an embodiment, the reverse transform computation device 110 applies transforms to the output image pixel addresses 208. A first transformation (transformation A) may be applied to a first subset of pixel addresses 208 to create accurate transformed input image addresses for pane A, a second transformation (transformation B) may be applied to a second set of pixel addresses 208 to create accurate transformed input image addresses for pane B, and a third transformation (transformation C) may be applied to a third set of pixel addresses to create accurate transformed input image addresses for pane C.

In one embodiment, each of the three transformations is applied to every pixel address 208 within the grid 206 (and, thus, all the subsets fully overlap and include the same pixel addresses 208). In another embodiment, each transformation is applied to only the pixel addresses 208 needed to create the pane associated with that transformation (and, thus, each subset includes different pixel addresses). For example, only the pixel addresses 208 depicted in FIG. 2A may be transformed using a first transformation, only the pixel addresses 208 depicted in FIG. 2B may be transformed using a second transformation, and only the pixel addresses 208 depicted in FIG. 2C may be transformed using a third transformation. In accordance with this embodiment, the subsets of pixel addresses will partially overlap, e.g., near the boundaries 204.

At step 304, boundary conditions are identified. In an embodiment, boundary conditions (such as left boundary condition 204a and right boundary condition 204b) are manually determined and stored in the reverse transform device 108. For a straight, non-horizontal line expressed as x=Ay+B where x is horizontal distance, y is vertical distance, and A and B are constants, the left boundary condition 204a may be represented by the mathematical expression set forth in equation (1) and the right boundary condition 204b may be represented by the mathematical expression set forth in equation (2):

$$\text{Left condition: } x < ((A_L * y) + B_L) \quad (1)$$

$$\text{Right condition: } x > ((A_R * y) + B_R) \quad (2)$$

where x is the horizontal address of the output image pixel to be transformed, y is the vertical address of the output pixel to be transformed.

In embodiments where the reverse transform computational device 110 applies every reverse transformation to every pixel address 208 in the grid 206, step 304 may be performed before or after the transformations are applied in step 302. In embodiments where the reverse transform computational device 110 applies the reverse transformation to only pixel addresses 208 of panes associated with a particular transformation, step 304 is performed before the transformations are applied in step 302.

At step 306, transformed input image pixel addresses are stored. In an embodiment, transformed input image pixel address are stored in storage device 106 by reverse transform device 108. The transformed addresses may be selectively stored for each of the output image addresses based on the proximity of each of the output image addresses to the boundary condition.

Figure 3A:
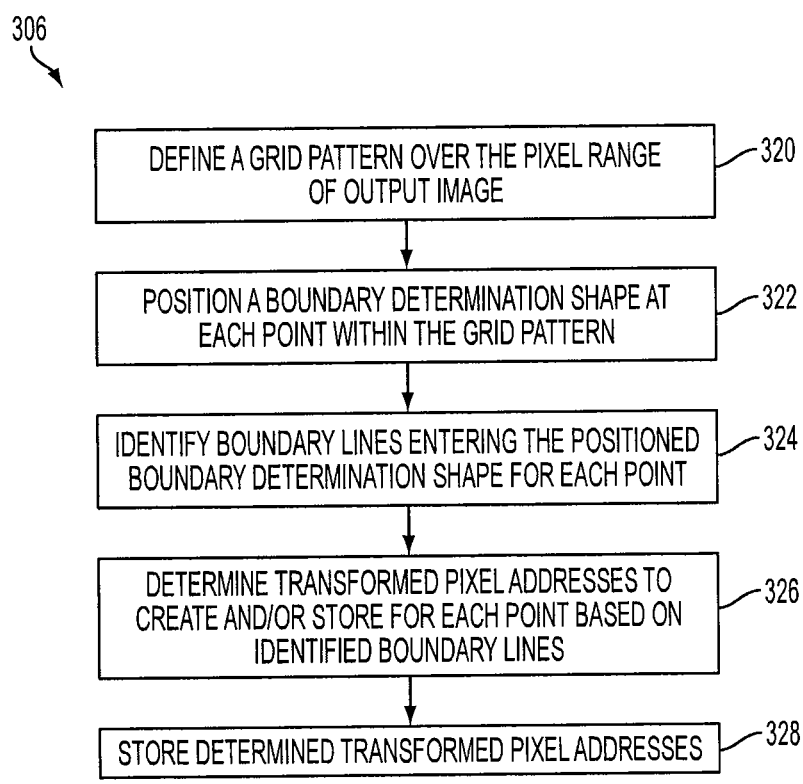
FIG. 3A is a flow chart of steps for storing transformed pixel addresses in accordance with aspects of the present invention.

FIG. 3A depicts steps for selectively storing transformed pixels in accordance with embodiments of the present invention. At step 320, a grid pattern is defined over the pixel range of the output image. In an embodiment a grid pattern such grid pattern 206 is defined over a multi-pane output image such as output image 200, which includes a left boundary condition 204a and a right boundary condition 204b. The grid pattern 206 may be rectangular, square or other shape. The horizontal spacing is referred to herein as X and the vertical spacing is referred to herein as Y.

Figure 2D:
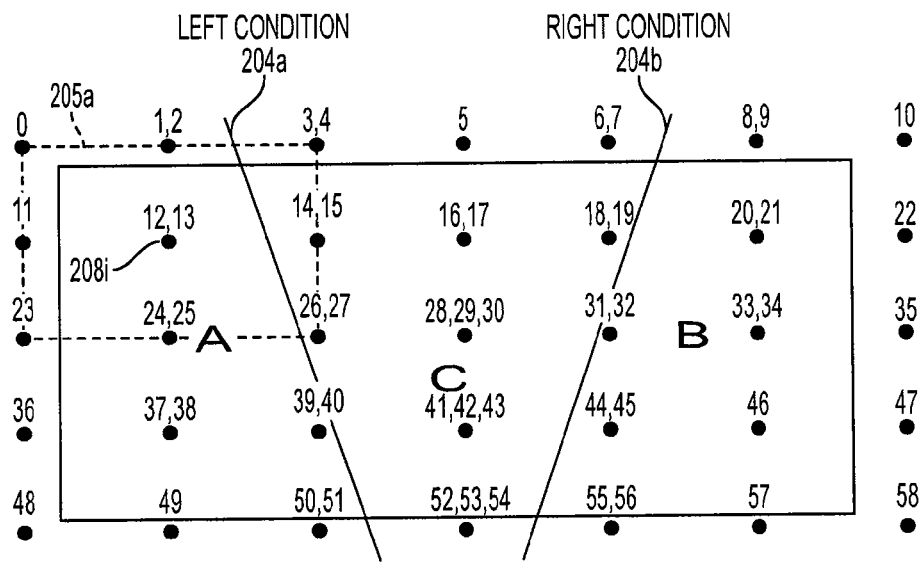
FIGS. 2D, 2E, and 2F are illustrations of the multi-pane output image of FIG. 2, with a boundary determination shape positioned over different points within the grid of FIG. 2 to determine the number of transformed pixel addresses to store for the respective pixels in accordance with aspects of the present invention.
Figure 2E:
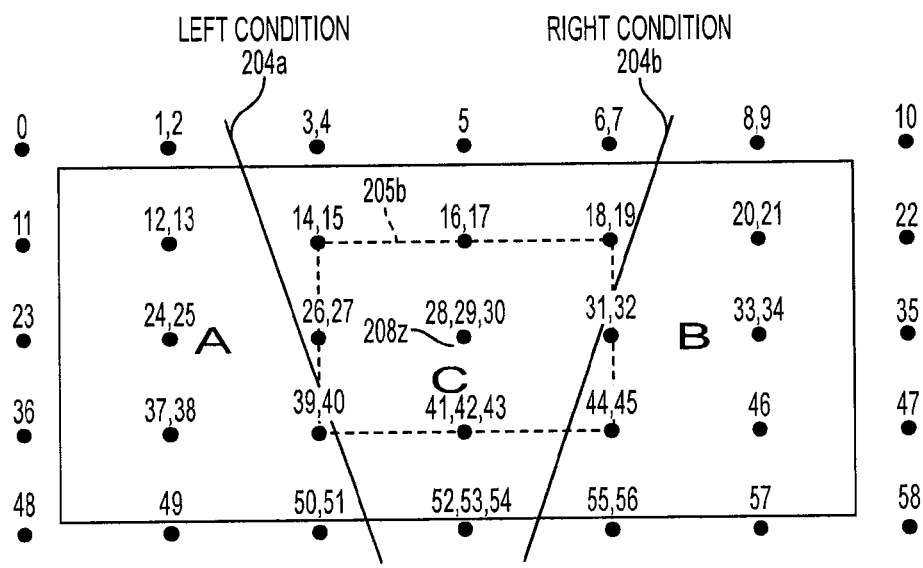
Figure 2F:
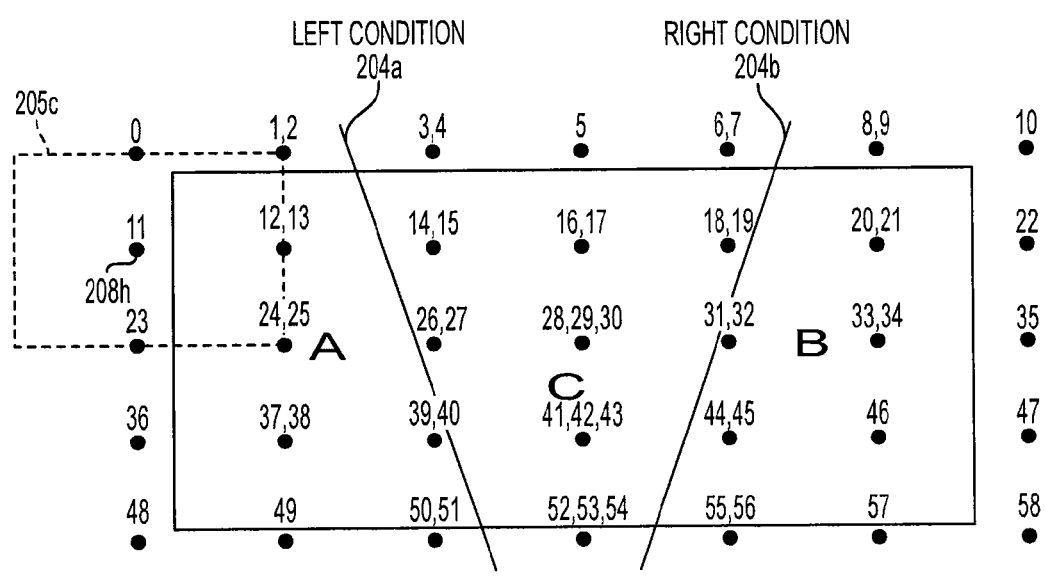

At step 322, a boundary determination shape is positioned at each point within the grid. In an embodiment the boundary determination shape may be a rectangle, square, or other shape where the length of the horizontal sides is twice the horizontal spacing between points in the grid 206 and the length of the vertical sides is twice the vertical spacing between points in the grid 206. If the grid points are equally spaced horizontally and vertically, the boundary determination shape may be a square. FIG. 2D depicts a boundary determination shape 205a positioned over point 208i, FIG. 2E depicts a boundary determination shape 205b positioned over point 208z, and FIG. 2F depicts a boundary determination shape 205c positioned over point 208h. For every grid point, with location (uX, vY), the boundary determination shape is centered on that point, which will have corners given by locations:

$$((u-1)X, (v-1)Y)((u+1)X, (v-1)Y),$$

$$((u-1)X, (v+1)Y)((u+1)X, (v+1)Y)$$

In one embodiment, the boundary determination shape may be positioned through manual input to a computer system (not shown) using conventional techniques such as dragging and dropping the shape using a computer mouse (not shown). In another embodiment, positioning of the boundary determination shape may be automated. In accordance with this embodiment, the boundary determination shape may be applied using a conventional interpolation scheme. For bilinear interpolation, for example, 2 by 2 accurately transformed pixel addresses are supported. Thus, a boundary line passing through a rectangular boundary determination shape defined by these four accurately transformed pixel addresses will result in all of them storing points for both transforms that intersect at the boundary. If two boundary lines pass through the rectangular boundary determination shape, all of them will store points for all the transforms that intersect at the boundary (i.e., three points if the boundary lines don't intersect within the boundary determination shape and four points if they do). From the point of view of an accurately transformed point in the output image, a single boundary line passing through any or all of the four rectangles of which that point is a vertex will cause it to be a double point. For interpolations requiring larger supports such as biquadratic and bicubic, the boundaries may be extended further to encompass more points.

At step 324, boundary lines entering the boundary determination shape are identified. For example, when boundary determination shape is positioned over point 208*i*, one boundary line 204*a* separating panes A and C of the multi-pane output image 200 passes through the boundary determination shape 205*a* as depicted in FIG. 2D (which indicates a set of two input image addresses need to be stored; e.g., one determined through a first transformation associated with the left pane and one determined through a second transformation associated with the center pane). When boundary determination shape is positioned over point 208*z*, two boundary lines pass through the boundary determination shape as depicted in FIG. 2E (which indicates a set of three input image addresses need to be stored; e.g., one determined through a first transformation associated with the left pane, one determined through a second transformation associated with the center pane, and one determined through a third transformation associated with the right pane). When boundary determination shape is positioned over point 208*h*, no boundary lines pass through the boundary determination shape as depicted in FIG. 2F (which indicates a set of one input image address needs to be stored; e.g., one determined through a first transformation associated with the left pane). In other words, to determine the number of addresses for each point, count the number of lines that enter the boundary determination shape 205 and add one. Note that the boundaries are defined in the output picture co-ordinates, which are the input to the address transformation.

At step 326, a determination is made regarding which pixel address to create and/or store based on the identified boundary lines entering the boundary determination shape and, at step 328, the determined transformed pixel addresses are stored, e.g., in storage device 106. In an embodiment, the number of created and/or stored pixel addresses equals the number of boundary lines intersecting the boundary condition shape plus one.

In embodiments where the reverse transform computational device 110 applies every reverse transformation to every pixel address 208 in the grid 206, the reverse transform device 108 may store only the necessary addresses and discard the rest. For example, reverse transformation computation device 110 may apply the transform to every point and transform merge device 112 may selectively store only the transformed addresses that are used to generate the interpolated transformed image. In embodiments where the reverse transform computational device 110 applies the reverse transformation to only pixel address 208 necessary to produce the individual panes, all the transformed addresses may be stored and the transform merge device 112 may be omitted. In accordance with this embodiment, for a single point the reverse transform computational device 110 computes one position. For a double point two positions are computed, one corresponding to one side of the boundary condition and one corresponding to the other side of the pane boundary. For a triple point three positions are computed if the boundary lines do not cross and four are computed if the boundary lines cross within the boundary determination shape.

In one embodiment, the data for each stored point is flagged to identify which boundary condition, e.g., equation (1) above for a left boundary 204*a* or equation (2) above for a right boundary 204*b*, to apply when using that point in order to choose the correctly transformed address.

Referring back to FIG. 3, at step 308, the multi-pane output image is created using the stored transformed pixel addresses and interpolation. In an embodiment, coordinate interpolator 102 produces accurately transformed pixel addresses and approximately transformed pixel addresses created by interpolating the accurately transformed pixel address. The produced accurately transformed pixel addresses and approximately transformed pixel addresses are supplied to a display system 104 for creation of the output image.

Figure 3B:
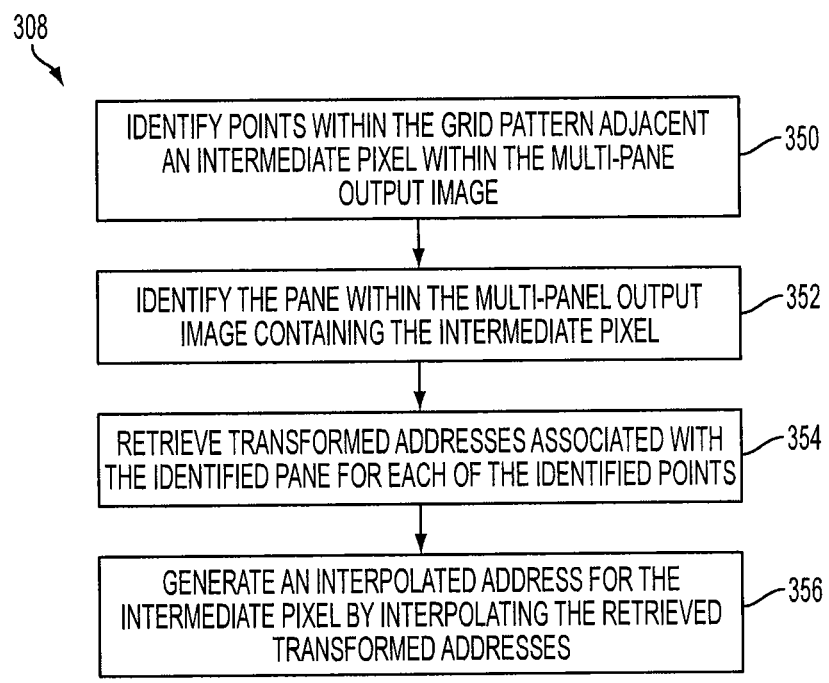
FIG. 3B is a flow chart of steps for generating an interpolated address in accordance with aspects of the present invention.

FIG. 3B depicts steps of creating the multi-pane output image. At step 350, points within the grid pattern adjacent an intermediate pixel within the multi-pane out image are identified. In an embodiment, the nearest grid points 208 to the left/right/top/and bottom are determined. For example, for grid point 212*a*, a rectangle defined by grid points 208*a, b, h*, and *i* may be identified. In one embodiment, a point with coordinates (x,y) is considered to lie in the lower right box given by upper left and lower right corners (uX,vY), ((u+1)X,(v+1)Y), where $uX \leq x < (u+1)X$, $vY \leq y < (v+1)Y$. For a hardware or software design, processing of points may be done in a regular order, such as a raster scan, which makes this implementation straight forward.

At step 352, the pane within the multi-pane output image is identified that contains the intermediate pixel.

At step 354, the transformed addresses associated with the identified pane for each of the identified points is retrieved. In an embodiment, the following process is performed for every point 208 adjacent the intermediate pixel: (a.) check the boundary flags for the point, (b.) apply the appropriate pane boundary equation(s), and (c.) use the stored value for the location of the point in the input image consistent with the equation results.

At step 356, the interpolated address for the intermediate pixel is generated by interpolating the retrieved transformed addresses. Having obtained the 4 correct interpolating points, perform bilinear interpolation to obtain the interpolated point in the input image.

Aspects of the invention enable reductions in the amount of memory used to store multiple image transformations for producing a single multi-pane output image. The multiple transform memories are merged into a single memory with memory reductions achieved by eliminating storage of unused transform coordinates. For example, to reproduce pane A (FIG. 2A), which is associated with transform A, transformed coordinates are not needed for point 208*e* (FIG. 2) in the illustrated embodiment. Thus, there is no need to store transformed coordinates for point 208*e* that are transformed using transform A.

Referring back to FIG. 3, in order to reconstruct each of the 3 transforms by interpolation it is necessary to store multiple transform coordinate values at some of the spatial locations. The numbers above each point represents the memory addresses that are consumed by coordinates at that location.

In one embodiment, each memory address location may have the following 32-bit data encoding:

| | Bit | | |
|---|---|---|---|
| 31 30 29 | | 15 14 | 0 |
| Data Flag | x_coord (12.3 fix signed) | y_coord (12.3 fix signed) | |

A two bit flag is used to define the number of transforms encoded at this particular output coordinate location and whether left or right or both boundary conditions should be evaluated. The number of transforms determines the number of memory locations consumed by a coordinate. The following tables depict the encoding scheme with bit 31 corresponding to the left boundary condition and bit 30 corresponding to the right boundary condition:

| | | Bit | | |
|---|---|---|---|---|
| | 31 30 29 | | 15 14 | 0 |
| Single Transform Coordinates (stores A or B or C) | | | | |
| address N | 0 0 | x_coord (transform A/B/C) | y_coord (transform A/B/C) | |
| Left condition - Two Transform Coordinates (stores A and C) | | | | |
| address N | 1 0 | x_coord (transform A) | y_coord (transform A) | |
| address N + 1 | — — | x_coord (transform C) | y_coord (transform C) | |
| Right condition - Two Transform Coordinates (stores B and C) | | | | |
| address N | 0 1 | x_coord (transform B) | y_coord (transform B) | |
| address N + 1 | — — | x_coord (transform C) | y_coord (transform C) | |
| Both conditions - Three Transform Coordinates (stores A, B, and C) | | | | |
| address N | 1 1 | x_coord (transform A) | y_coord (transform A) | |
| address N + 1 | — — | x_coord (transform B) | y_coord (transform B) | |
| address N + 2 | — — | x_coord (transform C) | y_coord (transform C) | |

For this encoding scheme, if bit 31 is set and bit 30 is not set, only the left boundary condition equation is applied. If the boundary condition is satisfied, the coordinates at address location N are used. Otherwise, the coordinates at address location N+1 are used. If bit 31 is not set and bit 30 is set, only the right boundary condition equation is applied. If the boundary condition is satisfied, the coordinates at address location N are used. Otherwise, the coordinates at address location N+1 are used. If both bit 31 and bit 30 are set, both the left and right boundary condition equations are applied. First, the left boundary condition equation is applied. If the left boundary condition is satisfied, the coordinates at address location N are used. If the left boundary condition equation is not satisfied, the right boundary condition equation is applied. If the right boundary condition equation is satisfied, the coordinates at address location N+1 are used. Otherwise, the coordinates at address location N+2 are used.

The table below shows the actual encoding of the last row of coordinates for the output image 200 depicts in FIG. 2 in accordance with one embodiment:

| | Bit | | | |
|---|---|---|---|---|
| | 31 | 30 | 29    15 | 14    0 |
| address 48 | 0 | 0 | x_coord (transform A) | y_coord (transform A) | 1 transform |
| address 49 | 0 | 0 | x_coord (transform A) | y_coord (transform A) | 1 transform |
| address 50 | 1 | 0 | x_coord (transform A) | y_coord (transform A) | 2 transforms |
| address 51 | — | — | x_coord (transform C) | y_coord (transform C) | |
| address 52 | 1 | 1 | x_coord (transform A) | y_coord (transform A) | 3-transforms |
| address 53 | — | — | x_coord (transform B) | y_coord (transform B) | |
| address 54 | — | — | x_coord (transform C) | y_coord (transform C) | |
| address 55 | 0 | 1 | x_coord (transform B) | y_coord (transform B) | 2 transforms |
| address 56 | — | — | x_coord (transform C) | y_coord (transform C) | |
| address 57 | 0 | 0 | x_coord (transform B) | y_coord (transform B) | 1 transform |
| address 58 | 0 | 0 | x_coord (transform B) | y_coord (transform B) | 1 transform |

For this example, if three complete transforms were stored then each transform would consume 7×5 memory locations, representing 7×5×3=105 memory locations. With the efficient method of combining multiple views the 3 merged transforms can be stored in 59 memory locations, a reduction of 56%. For denser grids even higher efficiencies may be achieved.

The encoding scheme described above demonstrates a specific implementation of multi-paned transforms that defines three transform regions. One of skill in the art will understand from the description herein how to extend this technique to handle more transform regions and more complex region boundaries, e.g., by changing/extending the encoding of the flag.

A lossless compression method in accordance with one embodiment is now described that can be used to further reduce memory requirements. A transformation is made up of a 2-D array of X and Y coordinates. Both the X and Y values naturally increment or decrement across the width and height of the image. Therefore instead of encoding the absolute value of X and Y, we can encode the incremental difference both horizontally and vertically from previous adjacent values. The incremental difference will be much smaller in magnitude and hence require fewer bits to encode.

The values in the table below represents the rows (1-5) and columns (A-E) of X coordinates of an example transform. The Y coordinates and any multi-panel transforms have been omitted for clarity.

| X | A | B | C | D | E | Max absolute value in row (excl. Col A) | Encoding (columns B-E) |
|---|---|---|---|---|---|---|---|
| 1 | 34 | 38 | 45 | 57 | 60 | 60 | 15-bit signed |
| 2 | 24 | 34 | 39 | 53 | 56 | 56 | 15-bit signed |
| 3 | 22 | 33 | 40 | 51 | 54 | 54 | 15-bit signed |
| 4 | 18 | 25 | 38 | 55 | 60 | 60 | 15-bit signed |
| 5 | 21 | 23 | 33 | 58 | 70 | 70 | 15-bit signed |

The table below shows encoding rules to produce a 2D array of X differences in accordance with one embodiment.

| TRANSFORM | A | B | C | D | E |
|---|---|---|---|---|---|
| 1 | = A1 | = (B1 − A1) | = (C1 − B1) | = (D1 − C1) | = (E1 − D1) |
| 2 | = A2 | = (B2 − A2) − (B1 − A1) | = (C2 − B2) − (C1 − B1) | = (D2 − C2) − (D1 − C1) | = (E2 − D2) − (E1 − D1) |
| 3 | = A3 | = (B3 − A3) − (B2 − A2) | = (C3 − B3) − (C2 − B2) | = (D3 − C3) − (D2 − C2) | = (E3 − D3) − (E2 − D2) |
| 4 | = A4 | = (B4 − A4) − (B3 − A3) | = (C4 − B4) − (C3 − B3) | = (D4 − C4) − (D3 − C3) | = (E4 − D4) − (E3 − D3) |
| 5 | = A5 | = (B5 − A5) − (B4 − A4) | = (C5 − B5) − (C4 − B4) | = (D5 − 05) − (D4 − C4) | = (E5 − D5) − (E4 − D4) |

This table described using two generalized rules: (1) $x\_diff_{(row,0)} = x_{(row,0)}$ for the leftmost column (A) and (2) $x\_diff_{(row,col)} = x_{(row,col)} - x_{(row,col-1)} - x\_diff_{(row-1,col)}$. Applying these rules, the encoded 2D array can be represented as follows:

| X | A | B | C | D | E | Max absolute value in row (excl. Col A) | Encoding (columns B-E) |
|---|---|---|---|---|---|---|---|
| 1 | 34 | 4 | 7 | 12 | 3 | 12 | 5-bit signed |
| 2 | 24 | 6 | −2 | 2 | 0 | 6 | 4-bit signed |
| 3 | 22 | 1 | 2 | −3 | 0 | 3 | 3-bit signed |
| 4 | 18 | −4 | 6 | 6 | 2 | 6 | 4-bit signed |
| 5 | 21 | −5 | −3 | 8 | 7 | 8 | 5-bit signed |

It can be seen that the values in the above table have a much smaller magnitude than the original set of values, with the exception of the leftmost column (where values have not changed) and (to a lesser extent) the topmost row (where only a horizontal difference is performed due to the lack a previous row).

For the above example the original uncompressed values of X are 15-bit signed values. If we instead encode the difference values we can significantly reduce the bit width used to encode a row of values.

For a three panel system there can be up to 3 X,Y coordinate pairs per row/column position, which is indicated by a 2-bit flag. If present, the 2nd and 3rd X,Y coordinate pairs will use the 1st X,Y coordinate pairs from their adjacent locations to calculate a difference because the 2nd and 3rd X,Y coordinate pairs may not exist in adjacent locations. The table below depicts an example transform that may need to store multiple X,Y coordinates per location. In the table, (x1,y1) represents a first transform, (x2,y2) represents a second transform, and (x3,y3) represents a third transform.

| Ex | A | B | C | D | E |
|---|---|---|---|---|---|
| 1 | (x1, y1)$_{A1}$ | (x1, y1)$_{B1}$ | (x1, y1)$_{C1}$ | (x1, y1)$_{D1}$ | (x1, y1)$_{E1}$ |
| 2 | (x1, y1)$_{A2}$ | (x1, y1) (x2, y2)$_{B2}$ | (x1, y1)$_{C2}$ | (x1, Y1)$_{D2}$ | (x1, y1)$_{E2}$ |
| 3 | (x1, y1) (x2, y2) (x3, y3)$_{A3}$ | (x1, y1) (x2, y2)$_{B3}$ | (xl, y1)$_{C3}$ | (x1, y1)$_{D3}$ | (x1, y1)$_{E3}$ |
| 4 | (x1, y1)$_{A4}$ | (x1, y1) (x2, y2) (x3, y3)$_{B4}$ | (x1, y1)$_{C4}$ | (x1, y1)$_{D4}$ | (x1, y1)$_{E4}$ |
| 5 | (x1, y1)$_{A5}$ | (x1, y1)$_{B5}$ | (x1, y1)$_{C5}$ | (x1, y1)$_{D5}$ | (x1, y1)$_{E5}$ |

As an example, the difference calculations for position B2 associated with a first transform and with a second transform may be determined as set form in equations (3) and (4):

$$x\_diff1_{B2} = (x1_{B2} - x1_{A2}) - (x1_{B1} - x1_{A1}) \quad (3)$$

$$x\_diff2_{B2} = (x2_{B2} - x1_{A2}) - (x1_{B1} - x1_{A1}) \quad (4)$$

The difference calculations for position B4 associated with a first transform, a second transform, and a third transform may be determined as set forth in equations (5), (6), and (7):

$$x\_diff1_{B4} = (x1_{B4} - x1_{A4}) - (x1_{B3} - x1_{A3}) \quad (5)$$

$$x\_diff2_{B4} = (x2_{B4} - x1_{A4}) - (x1_{B3} - x1_{A3}) \quad (6)$$

$$x\_diff3_{B4} = (x3_{B4} - x1_{A4}) - (x1_{B3} - x1_{A3}) \quad (7)$$

Equations (3)-(7) can be generalized as shown in equations (8), (9), and (10):

$$x\_diff1_{(row,col)} = (x1_{(row,col)} - x1_{(row,col)}) - x\_diff1_{(row-1,col)} \quad (8)$$

$$(\text{if needed}) x\_diff2_{(row,col)} = (x2_{(row,col)} - x1_{(row,col-1)}) - x\_diff1_{(row-1,col)} \quad (9)$$

$$(\text{if needed}) x\_diff3_{(row,col)} = (x3_{(row,col)} - x1_{(row,col-1)}) - x\_diff1_{(row-1,col)} \quad (10)$$

Figure 4:
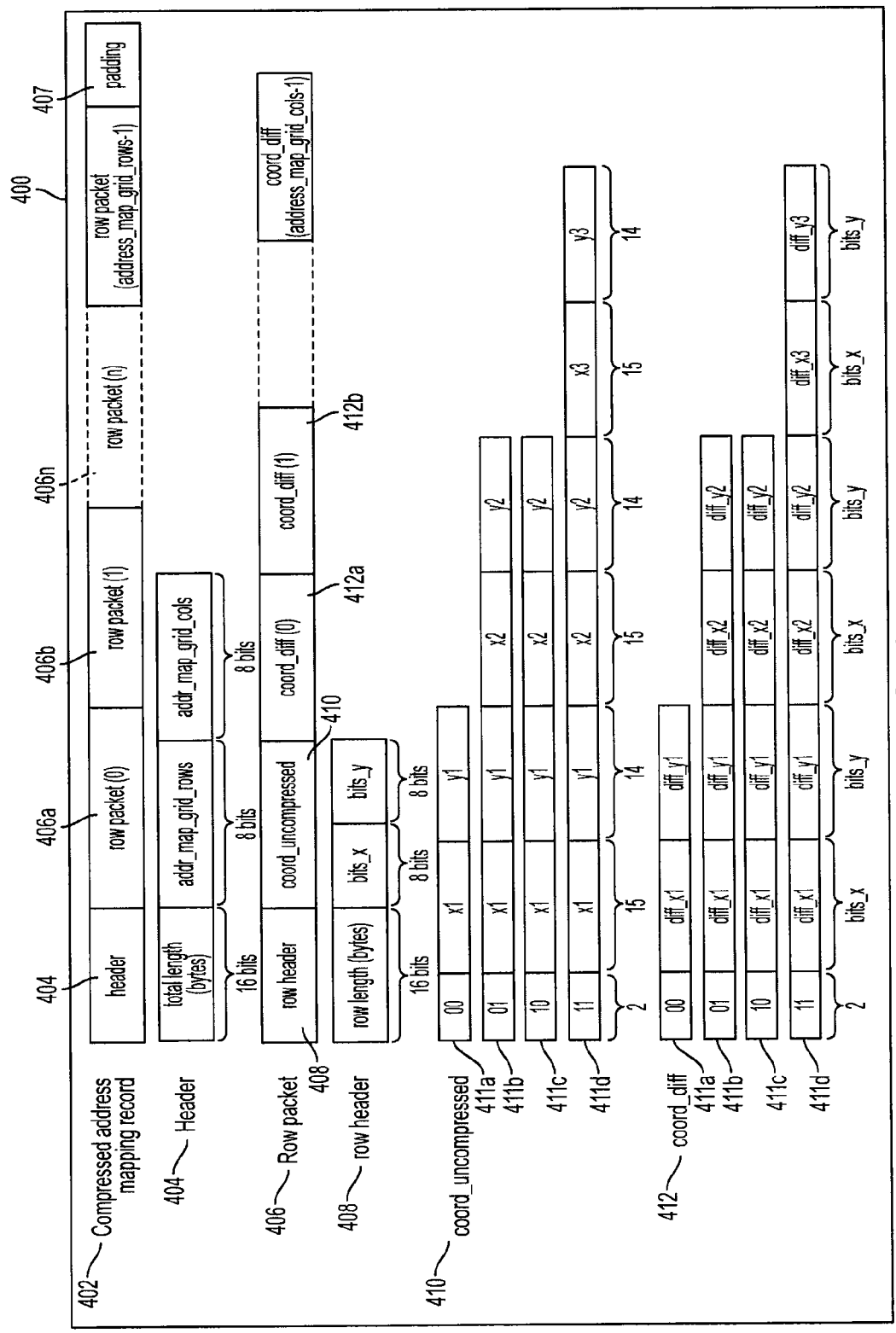
FIG. 4 is a collection of tables depicting a format for a compressed address mapping record in accordance with an aspect of the present invention.

FIG. 4 depicts a collection of tables 400 illustrating a format of a compressed address mapping record in accordance with one embodiment. A compressed address mapping record 402 includes a header 404, multiple row packets 406, and padding 407. The padding 407 is used to ensure the compressed address mapping record is an integer number of bytes in this embodiment. The row packets 406 include a row header 408, coordinate uncompressed (coord_uncompressed) data 410, and coordinate difference (coord_diff) data 412. Coord_uncompressed 410 and coord_diff 412 can each be 3 different lengths depending on the 2-bit flag 411.

Although the invention is illustrated and described herein with reference to specific embodiments, the invention is not intended to be limited to the details shown. Rather, various modifications may be made in the details without departing from the invention.

What is claimed:

1. An image transform interpolation system that produces a multi-pane output image from an input image, each pane of the multi-pane output image associated with a respective image transformation, the system comprising:

a storage device storing a plurality of transformed input image address sets, each of the plurality of transformed input image address sets corresponding to a respective one of a subset of output image pixel addresses within the output image, a first of the transformed input image address sets corresponding to a first pane and including a first transformed address associated with a first pane image transformation and a second transformed address associated with a second pane image transformation, and a second of the transformed input image address sets corresponding to a second pane and including a third transformed address associated with the second pane image transformation but no transformed address associated with the first pane image transformation; and a coordinate interpolator operable to calculate an approximately transformed address of a first particular output pixel address corresponding to the second pane of the output image by interpolating at least the second transformed address.

2. The system of claim 1, wherein the multi-pane output image further includes a third pane.

3. The system of claim 2, wherein the first pane corresponds to a left pane of the multi-pane output image, the second pane corresponds to a center pane of the multi-pane output image, and the third pane corresponds to a right pane of the multi-pane output image.

4. The system of claim 3, wherein:
a third of the transformed image address sets corresponds to the first pane and consists of one transformed image address;
a fourth of the transformed image address sets corresponds to the second pane and includes three transformed image addresses;
a fifth of the transformed image address sets corresponds to the third pane and consists of one transformed image address; and
a sixth of the transformed image address sets corresponds to the third pane and includes two transformed image addresses.

5. The system of claim 1, further comprising:
a reverse transform device coupled to the storage device, the reverse transform device configured to generate the transformed input image address sets.

6. The system of claim 5, wherein the panes of the multi-pane output image are separated by boundary conditions and wherein the reverse transform device comprises:
a reverse transform computation device configured to transform each of the output image pixel addresses within the subset using each of the respective output image transformations; and
a transform merge device coupled to the reverse transform device, the transform merge device selectively discarding one or more of the transformed output image pixel addresses based on the boundary conditions.

7. The system of claim 1, wherein each address within each of the plurality of transformed input image address sets is stored in the storage device as an encoded multi-bit data element including a flag associated with a number of transformed input image addresses in the storage device for the respective one of the subset of output image pixel addresses within the output image.

8. The system of claim 1, wherein a representation of each address within each of the plurality of transformed input image address sets is stored in the storage device as an encoded multi-bit data element and wherein the representation of at least one address is a differential address with respect to at least one other address.

9. The system of claim 1, wherein a representation of each address within each of the plurality of transformed input image address sets is stored in the storage device as an encoded multi-bit data element, a first transformed image address set includes a plurality of address representations, a second transformed image address set includes at least two address representations, and all of the at least two address representations are stored in the storage device as differential addresses with respect to a first of the plurality of address representations.

10. The system of claim 1, further comprising:
a display system coupled to the coordinate interpolator to present the multi-pane output image based in part on the approximately transformed address.

11. A method for generating an efficient plurality of transformed input image address sets for producing a multi-pane output image from an input image, the method comprising:
applying a first transformation corresponding to a first output image pane to each of a first subset of output image pixel addresses to create a first plurality of transformed input image addresses;
applying a second transformation corresponding to a second output image pane to each of a second subset of output image pixel addresses to create a second plurality of transformed input image addresses, the first and second subsets of output image pixel addresses at least partially overlapping; and
storing;
for a first output pixel image address, a first transformed input image address set including a first transformed input image pixel address for the first output pixel image address as transformed by the first transformation and a second input image pixel address for the first output pixel image address as transformed by the second transformation and,
for a second output pixel image address, a second transformed input image address set including a third input image pixel address for the second output pixel image address as transformed by the first transformation, but no transformed address for the second output pixel image address as transformed by the second transformation.

12. The method of claim 11, further comprising:
identifying a boundary condition between the first and second output image panes; and
wherein the storing step comprises selectively storing the transformed addresses for each of the output image addresses based on the proximity of each of the output image addresses to the boundary condition.

13. The method of claim 11, further comprising:
applying a third transformation corresponding to third output image pane to each of a third subset of output image pixel addresses to create a third plurality of transformed input image addresses.

14. The method of claim 13, wherein the first output image pane corresponds to a left pane of the multi-pane output image, the second output image pane corresponds to a central pane of the multi-pane output image, and the third output image pane corresponds to a right pane of the multi-pane output image.

15. The method of claim 13, wherein the number of pixel addresses in the first subset of output image pixel addresses equals the number of pixel addresses in the second subset of output image pixel addresses equals the number of pixel addresses in the third subset of output image pixel addresses.

16. The method of claim 11, wherein the first and second panes are separated by a boundary line and the storing step comprises:
defining a grid pattern of points including the first output image pixel address;
positioning a boundary determination shape at the first output image pixel address;

identifying the boundary line within the boundary determination shape at the first output image pixel address; and storing the first transformed input image address set including the first and second transformed input image pixel addresses for the first output pixel image address based on the identified boundary line.

17. The method of claim 16, further comprising:

determine transformed pixel addresses to store for the first output pixel image address based on the identified boundary line.

18. The method of claim 16, further comprising:

determine transformed pixel addresses to create for the first output pixel image address based on the identified boundary line.

19. The method of claim 11, further comprising:

creating the multi-pane output image by using the stored transformed pixel addresses for the first and second subsets of output pixel addresses and by using interpolation of the stored transformed pixel addresses for intermediate output image addresses between the first and second subsets of output pixel addresses.

20. The method of claim 19, further comprising:

identifying output pixel addresses within the first and second subsets adjacent a first intermediate output image address;

identifying a pane within the multi-pane output image containing the first intermediate output image address;

retrieving transformed addresses associated with the identified pane for the identified adjacent output pixel addresses; and generating an interpolated address for the first intermediate output image address by interpolating the retrieve transformed addresses.

* * * * *